(12) United States Patent
Morin et al.

(10) Patent No.: US 8,561,556 B2
(45) Date of Patent: *Oct. 22, 2013

(54) COMBUSTION INSTALLATION WITH $CO_2$ RECOVERY

(75) Inventors: Jean-Xavier Morin, Neuville aux Bois (FR); Corine Beal, Voisins le Bretonneux (FR)

(73) Assignee: ALSTOM Technology Ltd, Baden (CH)

( * ) Notice: Subject to any disclaimer, the term of this patent is extended or adjusted under 35 U.S.C. 154(b) by 1124 days.

This patent is subject to a terminal disclaimer.

(21) Appl. No.: 12/423,173

(22) Filed: Apr. 14, 2009

(65) Prior Publication Data

US 2009/0199749 A1 Aug. 13, 2009

Related U.S. Application Data

(63) Continuation of application No. 10/542,749, filed on Jan. 23, 2006, now Pat. No. 7,533,620.

(51) Int. Cl.
*F23G 5/30* (2006.01)

(52) U.S. Cl.
USPC ............... 110/245; 110/216; 75/448; 75/450

(58) Field of Classification Search
USPC ......... 110/204, 216, 232, 233, 234, 243, 244, 110/245, 346, 347, 348; 208/112; 209/138; 75/448, 450

See application file for complete search history.

(56) References Cited

U.S. PATENT DOCUMENTS

| | | | |
|---|---|---|---|
| 2,834,561 A | 6/1958 | Beinfest et al. | |
| 2,845,620 A | 7/1958 | Hammond, Jr. et al. | |
| 2,848,641 A | 8/1958 | Peterson et al. | |
| 2,850,156 A | 9/1958 | Shane | |
| 3,807,090 A * | 4/1974 | Moss | 110/264 |
| 3,888,193 A * | 6/1975 | Kishigami et al. | 110/245 |
| 4,946,044 A | 8/1990 | Havrilla | |
| 5,069,171 A * | 12/1991 | Hansen et al. | 110/245 |
| 5,355,609 A | 10/1994 | Schenke | |
| 5,471,955 A | 12/1995 | Dietz | |
| 5,509,362 A | 4/1996 | Lyon | |
| 5,878,677 A * | 3/1999 | Muller et al. | 110/345 |
| 6,494,153 B1 * | 12/2002 | Lyon | 110/345 |
| 6,572,761 B2 | 6/2003 | Lyon | |
| 7,533,620 B2 * | 5/2009 | Morin et al. | 110/233 |

FOREIGN PATENT DOCUMENTS

EP  1 441 859  6/2005

OTHER PUBLICATIONS

PCT International Search Report dated May 8, 2008—(PCT/FR2004/050000).
R.K. Lyon and J.A. Cole: "Pollution Free Combustion of Coal and Other Fossil Fuels" Oct. 26, 1998.

\* cited by examiner

*Primary Examiner* — Kenneth Rinehart
*Assistant Examiner* — David J. Laux
(74) *Attorney, Agent, or Firm* — James J. Cummings

(57) ABSTRACT

An installation for combustion (1) of carbon-containing solids includes an oxide reducing reactor (2), a first cyclone (5), a recuperator (6), an oxidation reactor (3), a second cyclone (4), wherein flows an oxide which is reduced then oxidized in each of the two reactors (2 and 3). In the installation, the fuel is ground before being introduced into the reduction reactor (3). The reduced size of the solid fuel particles enables more complete and faster combustion and enables almost 100% production of fly ashes which are separated from the circulating oxides.

20 Claims, 2 Drawing Sheets

COMBUSTION INSTALLATION WITH $CO_2$ RECOVERY

RELATED APPLICATIONS

The present application is a continuation of U.S. patent application Ser. No. 10/542,749, filed Jan. 23, 2006, which is a national phase application of PCT/FR2004/050000, which claims the benefit of priority from French Patent Application No. 03 00432, filed on Jan. 16, 2003, the entirety of which are incorporated herein by reference.

FIELD OF THE INVENTION

The present invention relates to combustion installations for burning carbon-containing solid materials to produce electricity and/or steam. The solid materials can be fossil fuels such as coal, for example, waste or biomass, and they are injected into a combustion chamber, for example a fluidized bed combustion chamber.

BACKGROUND OF THE INVENTION

Burning fossil fuels results in emission of gaseous $CO_2$ and of $SO_2$ in small quantities. The injection of limestone into the combustion chamber reduces the emission of $SO_2$ in situ, but this reduction in the emission of $SO_2$ is accompanied by production of secondary $CO_2$ in addition to the $CO_2$ produced by combustion of the carbon-containing materials. Because $CO_2$ is a greenhouse gas, its emission must be limited, imposing total or partial capture of the $CO_2$.

The $CO_2$ contained in the combustion flue gases can be captured in various ways and stored downstream of the combustion installation. Firstly, it is captured by washing it with a solvent, such as monoethanolamine, which selectively solubilizes the $CO_2$ contained in the flue gases, after which the solvent is regenerated by extracting the $CO_2$ by a heating process involving injecting steam into a second reactor, after which the regenerated solvent is fed to the flue gas washing reactor. However, this solution requires treatment of the nitrogen acting as a necessary inert ballast for the combustion reaction and contained in the flue gases, of which $CO_2$ accounts for typically around 15% by volume. This means that the $CO_2$ capture installation must be rated in proportion to the quantity of nitrogen present. Furthermore, thermal regeneration has the drawback of necessitating large quantities of steam, which penalizes the energy efficiency of the electricity and/or steam production installation.

Replacing the nitrogen ballast contained in the combustion air with recycled $CO_2$ and carrying out combustion using an $O_2/CO_2$ oxidizing agent was then envisaged. However, the oxygen has to be produced from air by an air separation unit and a cryogenic system that consumes a great deal of energy.

The above solutions are based on combustion and capture of $CO_2$ at atmospheric pressure, but it is also possible to produce installations integrated into electricity production cycles for gasifying under pressure solid fuels, such as coal. Gasification under pressure produces a synthetic fuel gas containing $CO_2$, $CO_2$ and $H_2O$. These gasification units are coupled to gas turbines and in this case the $CO_2$ under pressure is recovered by washing it with the solvent under pressure, which is more favorable for subsequent transportation of the $CO_2$, which must be effected in the supercritical liquid state at 150 bar. The gasification reaction uses oxygen under pressure produced by an air separator unit, which is costly. Apart from its complexity, the above type of installation is somewhat unreliable, as its availability is typically only 80%.

It is also known in the art to achieve combustion of gases (but not of solid materials) with integral $CO_2$ recovery using a metal oxide as an oxygen vector. The oxide circulates between two reactors in which it is either oxidized in a circulating bed reactor by bringing it into contact with air or reduced by bringing it into contact with the gaseous fuel. This method has the advantage of not necessitating separation of air, since the oxide constitutes the oxygen vector, but it cannot be used with solid fuels. Also, these installations must be totally airtight between the two reactors so as not to pollute air depleted in $O_2$ leaving the oxidation reactor with $CO_2$ leaking from the reduction reactor. However, to use gaseous fuel, which is very costly, it may be more economical to use high-efficiency (60%) gas turbines associated with heat recovery installations for treating the flue gases, rather than boilers coupled to a lower efficiency (45%) steam turbine.

Finally, the $CO_2$ can be captured using a calcium carbonate cycle where the carbonates are formed downstream of a circulating fluidized bed installation in a circulating fluidized bed contact reactor, decomposed in a second reactor by input of heat, and recycled to the reactor in which they are brought into contact with the flue gases containing $CO_2$. The $CO_2$ released in this way can be recovered for storage.

Unfortunately, all these post-combustion $CO_2$ capture techniques have the drawback of increasing by a factor of up to two the investment cost of a conventional coal power station and require a large footprint.

OBJECTS AND SUMMARY OF THE INVENTION

The invention provides a combustion installation for burning carbon-containing solid materials that operates at atmospheric pressure, with integrated $CO_2$ capture, and requires no separation of air beforehand and no recycling of $CO_2$ to substitute for nitrogen in the combustion air. By virtue of its simplicity and its compactness, this system reduces $CO_2$ capture costs and produces steam for generating electricity.

A combustion installation according to the invention for burning carbon-containing solid materials includes an oxide reduction reactor, a first cyclone, an exchanger for recovering the flue gases, an oxide oxidation reactor, a second cyclone, and an exchanger for controlling the circulating oxide temperature, in which circulates an oxide that is reduced and then oxidized in each of the two reactors, which installation is characterized in that the solid fuel is ground before entering the oxide reduction reactor. The oxides are reduced by first bringing them into contact with the fuel, which reacts with the oxygen released by the oxide, and are then oxidized by bringing them into contact with air, which regenerates the oxide. The small size of the solid fuel particles results in more complete and faster combustion and produces almost 100% fly ash.

According to another feature, the installation releases concentrated $CO_2$ from the reduction reactor and combustion air from the oxidation reactor in separate circuits. Combustion occurs with separation of the flow of $CO_2$ produced and without separation of air.

According to one particular feature, the fuel is coal. Coal consists of volatile materials, moisture, ash and fixed carbon.

According to another feature, after grinding the coal has an average particle diameter of less than 500μ. The coal then fragments after it is introduced into the reactor for reducing oxides at a high temperature (from 700° C. to 1150° C.). This coal particle size range prevents the accumulation at the bottom of the reduction reactor of coarse ash that has to be extracted, and produces virtually 100% fly ash. The volatile materials from the coal are released very quickly after the coal is heated and react with the oxygen given off by the oxides to achieve partial combustion that continues with combustion of the fixed carbon.

According to another feature, the reduction reactor has a circulating fluidized bed fluidized by steam. Solid fuels have slow combustion kinetics, and it is therefore necessary to use a circulating fluidized bed as the reduction reactor to obtain the benefit of a long processing time via internal recirculation of solids in the reactor and external recirculation via the first cyclone.

According to a complementary feature, the bed is fluidized with $CO_2$. In addition to steam, the bed is fluidized with a mixture of steam and recycled $CO_2$.

According to one particular feature, the mixture of oxides and carbon-containing residue extracted from the first cyclone is cleansed of the carbon-containing residue by an elimination device. The bed of solids made up of oxides and carbon-containing residues is recirculated at the bottom of the reduction reactor and a portion of the bed is extracted at the base of the siphon of the circulating bed and then cleansed or stripped in a dedicated device for eliminating the carbon-containing residue. The oxides from which the carbon-containing-residue has been removed are transferred to the oxidation reactor for oxidation with air at a high temperature. If the bed of solids were transferred directly into the oxidation reactor, the combustion of the carbon-containing residue would produce $CO_2$ and this would reduce the total capture of $CO_2$, unbalance the heat exchanges in the reactors, and lead to overrating of the heat exchanger of the oxidation reactor. The air depleted in oxygen is cooled in exchangers and then cleansed of dust before it is discharged to the atmosphere.

According to one particular feature, the device for eliminating the carbon-containing residue is fluidized only by steam. The steam can be condensed in the $CO_2$ cooling system. In this device fluidization separates the carbon-containing residue from the oxides by exploiting the differences in particle size and density between the oxides and the carbon-containing residue. The oxides have a particle size range from 50μ to 500μ and a density from 2000 kg/m·sup·3 to 7000 kg/m$^3$ and the carbon-containing residue has a particle size range from 5μ to 50μ and a density from 500 kg/m$^3$ to 1500 kg/m$^3$.

According to one particular feature, the carbon-containing residue is entrained with the steam and fed to the oxide reduction first reactor. By virtue of the fluidization, the finest and lightest particles, i.e. those of the carbon-containing residue, are entrained with the fluidization steam and fed to the reduction reactor. In the process of gasifying coal, steam has the further advantage, which is well known in the art, of converting to CO the carbon-containing residue that is fed to the reduction reactor. The fluidizing steam therefore acts as a separation agent, as a transport agent and as a converter of the carbon-containing residue.

According to one particular feature, a heat exchanger is disposed in an exterior bed under the bottom outlet from the cyclone of the oxidation reactor. A portion of the bed is recirculated to the bottom of the oxidation reactor and to the fluidized bed exchanger to regulate part-load operating temperatures by controlling the opening of the inlet valve for the recycled solids, which are therefore cooled after entering the exchanger.

According to one particular feature, an oxide and fly ash separator is placed after the heat exchangers for the flue gases rich in $CO_2$. Downstream of the cyclone, and after cooling in the heat exchangers, the combustion gases ($CO_2$, $H_2O$, $SO_2$) and the fly ash from the reduction reactor are separated by dust extractors. The fine oxide particles generated by wear of the particles rubbing against each other (attrition) and degradation are separated from the fly ash and fed to the oxidation reactor.

According to another feature, the oxidizing agent is a metal oxide. The metal oxide can be based on iron, nickel, alumina or a mixture thereof.

According to another feature, the metal oxide is based on iron. A metal oxide based on iron is preferred because this is the least costly metal oxide. The oxidizing agent can take the form of FeO, $Fe_2O_3$ or $Fe_3O_4$.

BRIEF DESCRIPTION OF THE DRAWINGS

The invention will be better understood after reading the following description, which is given by way of example only and refers to the accompanying drawings, in which.

DETAILED DESCRIPTION

Figure 1:
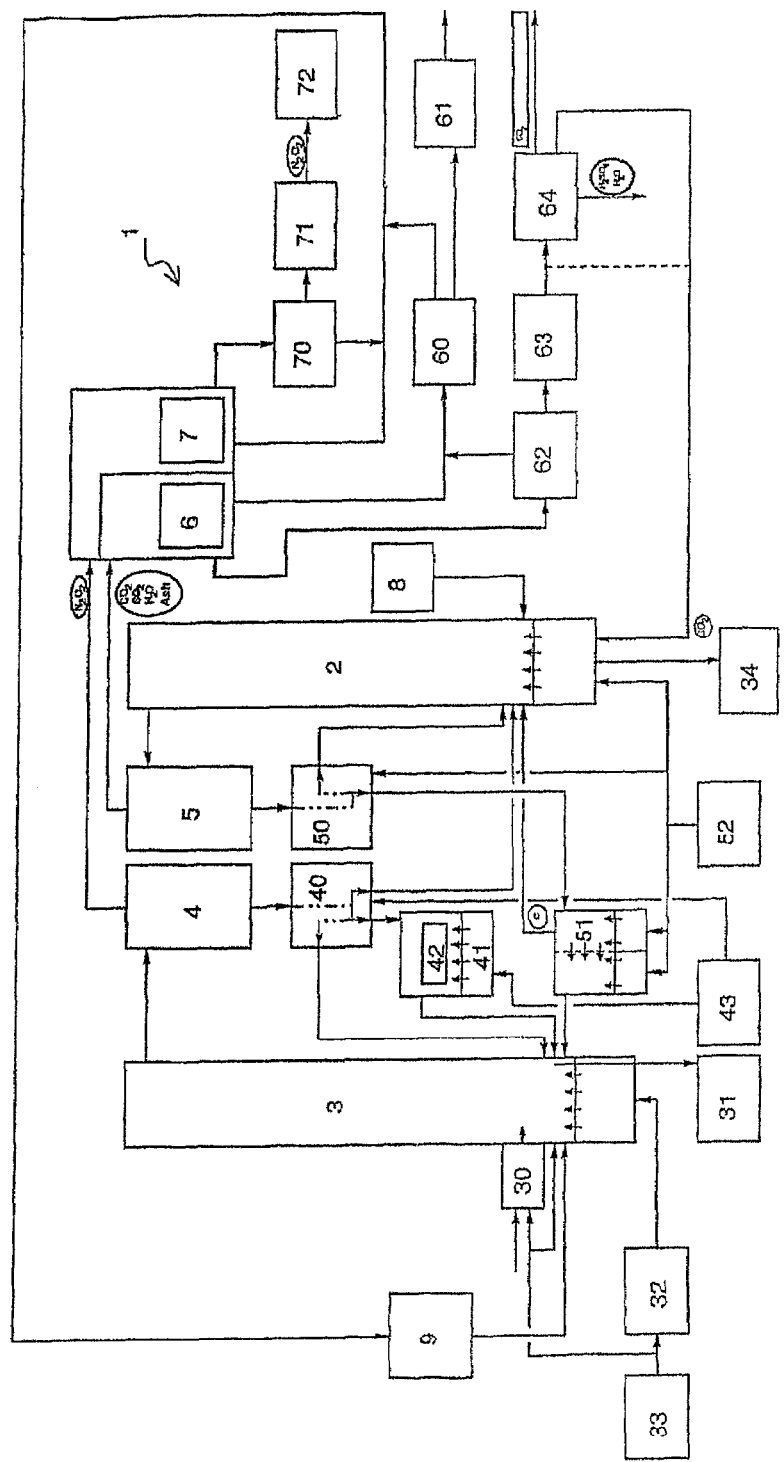
FIG. 1 is a general view of a combustion installation according to the invention.

The installation 1 includes an oxide reduction reactor 2, an oxide oxidation reactor 3, two cyclones 4 and 5, each dedicated to one reactor, and two rear cages 6 and 7 containing recovery exchangers 66 for the flue gases and 73 for the air, each dedicated to one of the reactors.

The reduction reactor 2 is fed with fuel from a pulverized coal silo 8. The coal is coarsely ground beforehand.

The reactor 2 is fluidized by a mixture of steam and recycled $CO_2$. When the installation is started up, the bed is fluidized only by steam.

After reduction in the reactor 2, the oxides enter the cyclone 5 in which the solid oxide particles are separated from the fly ash and the combustion gases, consisting of $CO_2$, $SO_2$ and steam.

The fly ash and the combustion gases then enter the heat exchangers 6. The fly ash is separated from the combustion gases in a bag filter 62. The mixture of $CO_2$, $H_2O$ and $SO_2$ is then fed into the cooling and condensing circuit 64 via an induced draft fan 63. The circuit 64 extracts the water and the remaining $H_2SO_4$ from the $CO_2$, some of which is then fed to the reactor 2.

The fly ash with a particle diameter of less than 50 μm and a density of approximately 800 kg/m$^3$ is separated from the oxides, whose particle size range is from 50 μm to 500 μm and whose density is from 2000 kg/m$^3$ to 7000 kg/m, in a separator 60 and stored in an ash silo 61, and the oxides are fed to the silo 9. Separation is effected by fluidization with low-temperature air in a fluidized bed reactor 60 in which the fluidization speed is selected to fluidize the fly ash and transfer it to a silo 61 via a pneumatic transport facility, and the oxides settle out and are extracted at the base of the fluidized bed reactor 60 and fed to the silo 9.

The solids leaving the cyclone 5, consisting of oxides and carbon-containing residues, enter a siphon 50 from which a first portion is fed to the reactor 2 and a second portion is fed to a device 51 for eliminating the carbon-containing residue. The siphon 50 is fluidized by steam 52.

Figure 2:
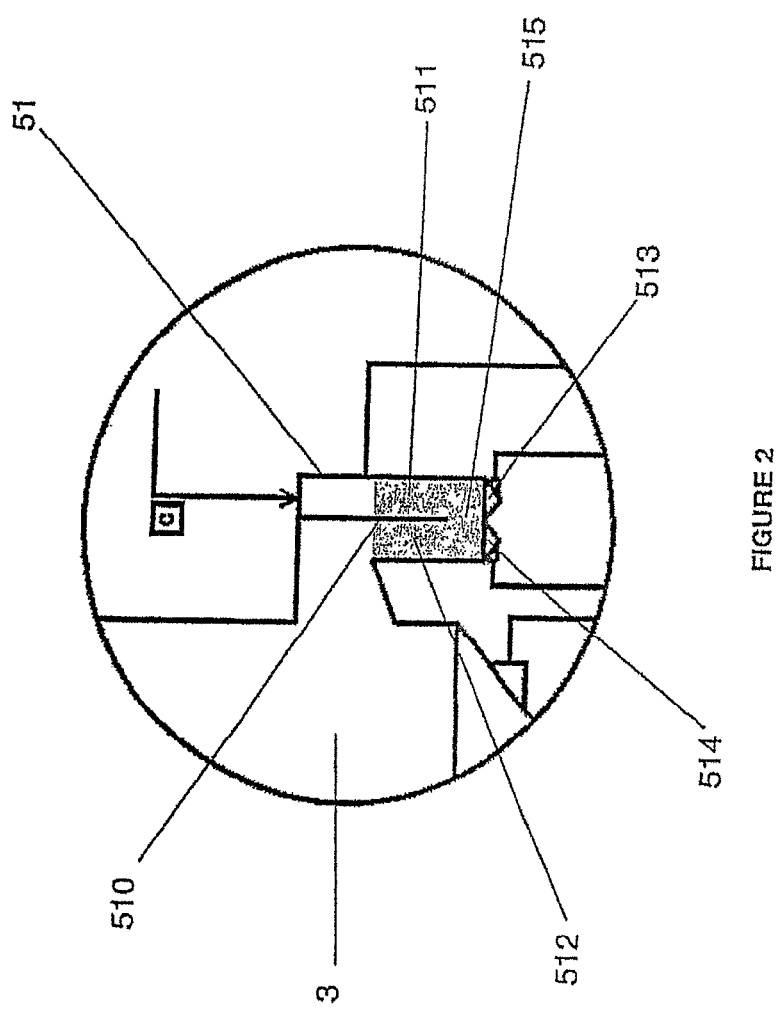
FIG. 2 is a detailed view of a carbon-containing residue separator.

The elimination device 51 is fluidized by steam 52, which separates out the fine and light particles, such as the carbon-containing residue, which is fed to the reactor 2, while the denser and larger oxide particles are fed to the reactor 3 for oxidation. As can be seen in FIG. 2, the device 51 includes an internal deflector 510 which delimits two compartments 511 and 512 on the path of the fluidized solids with a pressure seal due to the depth of fluidized solids 515 between the two compartments 511 and 512. The fluidization of each of the compartments 511 and 512 is controlled independently by two steam inlets 513 and 514, to obtain the required speed range to separate the oxides and the carbon-containing residue in the first chamber 511 and transfer the oxides into the second chamber 512. A vent at the top of the first compartment 511 feeds the carbon-containing residue entrained by the steam to the reactor 2.

The oxidation reactor 3 is equipped with a start-up system 30 that is fed with a fuel, such as gas, with oxides from the oxide silo 9, and with fluidization and oxidation air introduced via fans 32 and 33. The system 30 heats all of the reactors and the solids circulation loops to a temperature threshold above 700° C. and starts all of the reactions. The heated solid oxide particles react and heat the reduction reactor 2.

A fluidized bed made up of oxides circulates in the reactor 3 which is fluidized by air from the outside. After oxidation in the reactor 3, the oxides and the impoverished air enter the cyclone 4, in which the solid oxide particles are separated from the gases, consisting essentially of $N_2$ and $O_2$.

The air heated in the reactor 3 is cooled by heat exchangers 7. The entrained oxides are separated from the air by a bag filter 70 and fed to the silo 9. An induced draft fan 71 then discharges the air to the atmosphere via a flue 72.

The solid oxide particles extracted from the bottom of the cyclone 4 enter a siphon 40 from which a first portion is transferred to the bottom of the reactor 2, a second portion is recirculated to the bottom of the reactor 3, and a third portion is directed to an external bed 41 where there is a heat exchanger 42 fluidized by pressurized air 43, and finally fed to the reactor 3. The exchanger 42 regulates the temperature at the bottom of the reactor 3, in particular under part-load conditions. The siphon 40 is fluidized with compressed air, which also feeds the exterior bed 41.

The oxides in the reactor 3 can be topped up via the silo 9 and spent oxides are recovered in an oxide recovery silo 31. Topping up the oxides can also be justified to compensate losses by attrition in the reactors 2 and 3, to provide sufficient oxides for transferring the materials and circulating the solids.

A recovery silo 34 is disposed under the reactor 2 for periodic extraction of coarse ash particles and lumps.

The complete cycle of the various reactions is described next.

The ground fuel is injected into the reactor 2, which contains a circulating bed of oxide at a high temperature (700° C. to 1150° C.). In the case of coal, the average particle diameter is less than 500μ. The fuel fragments after it is introduced into said reactor 2. The particle size range of the fuel avoids the accumulation of coarse ash at the bottom of the reactor 2, that has to be extracted, and produces almost 100% fly ash. Thus ash does not accumulate in the circulating bed of coarser oxides, which is collected by the cyclone 5.

Because coal is a solid fuel with slow combustion kinetics and a volatile materials content from 20% to 60%, it is necessary to use a circulating fluidized bed reduction reactor in order to achieve in the reactor 2 a processing time that is extended by internal recirculation of the solids in the reactor and external recirculation via the cyclone 5.

The volatile materials are released very quickly following heating of the fuel and react with the oxygen given off by the oxides to achieve partial combustion that continues with the combustion of the fixed carbon.

A portion of the oxide bed is extracted at the bottom of the siphon 50 to be cleansed of the carbon-containing residues that have not been converted into fly ash, and is then fed to the reactor 3 in order to be oxidized by the oxygen in the air. The air impoverished in oxygen is cooled in the exchangers 7 and then has dust extracted from it by a bag filter 70 before it is discharged to the atmosphere.

The carbon-containing residue must not be transferred into the reactor 3, as this would lead to the exothermic production of $CO_2$, which would then be discharged to the atmosphere, and would therefore reduce the overall capture of $CO_2$ as well as increasing the size of the temperature control exchangers for the oxidation reactor 3.

The oxide regenerated after entering the reactor 3 is partly fed to the reactor 2 to start a new cycle of transport of oxygen from the reactor 3 to the reactor 2. The quantity of oxides fed to the reactor 2 is controlled by a solids flow rate control valve (not shown).

The other portion of the oxide bed is fed to the bottom of the reactor 3 and to a fluidized bed exchanger 41 in order to regulate the part-load operating temperatures by controlling the opening of a solids inlet valve (not shown).

The combustion system includes oxide top-up devices for replacing spent particles and particles that are lost in the cycle and extractor devices for renewing the oxide.

The heat exchangers 7 can advantageously be associated with a supercritical steam cycle (>600° C.) thanks to the non-corrosive nature of the impoverished high temperature air. The exchangers 66 can be associated with low-temperature heating of the supercritical steam.

The device can also be pressurized.

The invention claimed is:

1. A method for burning carbon-containing solid material in a combustion installation, said method comprising:
   providing the carbon-containing material to a reduction reactor having a fluidized bed to reduce an oxide, wherein the carbon-containing solid material is ground before entering the reduction reactor;
   oxidizing the oxide in an oxidation reactor having a fluidized bed;
   circulating the oxide from an upper portion of the reduction reactor to a lower portion of the oxidation reactor, and from an upper portion of the oxidation reactor to a lower portion of the reduction reactor;
   separating solid oxide particles and fly ash from the reduction reactor; and
   separating solid oxide particles and gas from the oxidation reactor, wherein the separated solid oxide particles from the oxidation reactor are provided to the reduction reactor; and
   providing the separated solid oxide particles from the reduction reactor to the oxidation reactor and the reduction reactor.

2. The method according to claim 1, further including providing a cyclonic separator that separates solid oxide particles from the separated fly ash separated from the reduction reactor.

3. The method according to claim 1, wherein the oxide is a metal oxide.

4. The method according to claim 3, wherein the metal oxide is based on iron.

5. The method according to claim 1, further including storing the solid oxide particles provided by the separator and providing the stored solid oxide particles to the oxidation reactor.

6. A method for burning carbon-containing solid material in a combustion installation, said method comprising:

providing the carbon-containing material to a reduction reactor having a fluidized bed to reduce an oxide, wherein the carbon-containing solid material is ground before entering the reduction reactor;

oxidizing the oxide in an oxidation reactor having a fluidized bed;

circulating the oxide from an upper portion of the reduction reactor to a lower portion of the oxidation reactor, and from an upper portion of the oxidation reactor to a lower portion of the reduction reactor;

separating solid oxide particles and fly ash from the reduction reactor, wherein the separated solid oxide particles are provided to the oxidation reactor; and separating solid oxide particles and gas from the oxidation reactor, wherein the separated solid oxide particles from the oxidation reactor are provided to the oxidation reactor and the reduction reactor.

7. The method according to claim 6, further including providing a cyclonic separator that separates solid oxide particles from the separated fly ash separated from the reduction reactor.

8. The method according to claim 6, wherein the oxide is a metal oxide.

9. The method according to claim 8, wherein the metal oxide is based on iron.

10. A method for burning carbon-containing solid material in a combustion installation, said method comprising:

providing the carbon-containing material to a reduction reactor having a fluidized bed to reduce an oxide, wherein the carbon-containing solid material is ground before entering the reduction reactor, and wherein the fluidized bed of the reduction reactor is fluidized with CO2 released from the reduction reactor;

oxidizing the oxide in an oxidation reactor having a fluidized bed;

circulating the oxide from an upper portion of the reduction reactor to a lower portion of the oxidation reactor, and from an upper portion of the oxidation reactor to a lower portion of the reduction reactor;

separating solid oxide particles and fly ash from the reduction reactor, wherein the separated solid oxide particles are provided to the oxidation reactor;

separating solid oxide particles and gas from the oxidation reactor, wherein the separated solid oxide particles from the oxidation reactor are provided to the reduction reactor; and providing a cyclonic separator that separates solid oxide particles from the separated fly ash separated from the reduction reactor.

11. The method according to claim 10, wherein the oxide is a metal oxide.

12. The method according to claim 11, wherein the metal oxide is based on iron.

13. The method according to claim 10, further including storing the solid oxide particles provided by the separator and providing the stored solid oxide particles to the oxidation reactor.

14. A method for burning carbon-containing solid material in a combustion installation, said method comprising:

providing the carbon-containing material to a reduction reactor having a fluidized bed to reduce an oxide, wherein the carbon-containing solid material is ground before entering the reduction reactor;

oxidizing the oxide in an oxidation reactor having a fluidized bed;

circulating the oxide from an upper portion of the reduction reactor to a lower portion of the oxidation reactor, and from an upper portion of the oxidation reactor to a lower portion of the reduction reactor;

separating solid oxide particles and fly ash from the reduction reactor, wherein the separated solid oxide particles are provided to the oxidation reactor;

separating solid oxide particles and gas from the oxidation reactor, wherein the separated solid oxide particles from the oxidation reactor are provided to the reduction reactor;

wherein the separated solid oxide particles from the reduction reactor includes a mixture of solid oxide particles and carbon-containing residue, and further including separating the carbon-containing residue and the solid oxide particles using an elimination device having a fluidized bed, wherein the separated solid oxide particles from the fluidized bed are provided to the oxidation reactor;

wherein the fluidized bed of the elimination device is fluidized by steam; and wherein the carbon-containing residue is entrained with the steam and fed to the reduction reactor.

15. The method according to claim 14, further comprising:

providing the separated fly ash to a first heat exchanger; and providing the gas to a second heat exchanger.

16. The method according to claim 15, further comprising:

providing concentrated $CO_2$ from the reduction reactor to the first heat exchanger, and wherein the gas is combustion air.

17. The method according to claim 14, wherein the carbon-containing solid material is coal.

18. The method according to claim 17, wherein after grinding, the coal has an average particle diameter of less than 500 µl.

19. The method according to claim 14, wherein the fluidized bed of the reduction reactor is fluidized with steam.

20. A method according to claim 14, wherein the fluidized bed of the reduction reactor is fluidized with CO2 released from the reduction reactor.

* * * * *